United States Patent
Suzuki et al.

(10) Patent No.: US 6,558,834 B2
(45) Date of Patent: May 6, 2003

(54) SPINEL-TYPE LIMN SECONDARY CELL (75) Inventors: Hiromi Suzuki, Tokyo (JP); Hideto Watanabe, Tokyo (JP)

(73) Assignee: NEC Tokin Corporation (JP)

( * ) Notice: Subject to any disclaimer, the term of this patent is extended or adjusted under 35 U.S.C. 154(b) by 0 days.

(21) Appl. No.: 09/967,120

(22) Filed: Sep. 28, 2001

(65) Prior Publication Data

US 2002/0045092 A1 Apr. 18, 2002

(30) Foreign Application Priority Data

Oct. 6, 2000 (JP) .......................... 2000-307776

(51) Int. Cl.[7] .............................. H01M 2/30; H01M 2/32
(52) U.S. Cl. ...................... 429/94; 429/179; 29/623.1
(58) Field of Search ................... 429/178–184, 429/231.95, 94; 29/623.1–623.5

(56) References Cited

U.S. PATENT DOCUMENTS 6,399,237 B1 * 6/2002 Souliac et al. ............... 429/170

FOREIGN PATENT DOCUMENTS

| JP | 9-92250 | | 4/1997 | ............ H01M/2/12 |
| JP | 2000-133221 A | * | 5/2000 | |
| JP | 2000-133221 | | 5/2000 | ............ H01M/2/08 |

* cited by examiner

Primary Examiner—Carol Chaney
Assistant Examiner—Susy Tsang-Foster
(74) Attorney, Agent, or Firm—Hayes Soloway P.C.

(57) ABSTRACT

A spinel-type LiMn secondary cell has an electrode unit including a positive electrode sheet made mainly of aluminum and coated with a positive electrode active material including lithium and manganese as indispensable constituents. The electrode unit is mounted in a cell casing as a negative electrode by an insulating assembly. A positive electrode member is made of an aluminum alloy with manganese mixed therewith for increased mechanical strength. Since manganese mixed with the aluminum alloy of the positive electrode member is an indispensable constituent of the positive electrode active material, it does not cause an unwanted chemical reaction such as electrolytic corrosion.

10 Claims, 6 Drawing Sheets

SPINEL-TYPE LIMN SECONDARY CELL

BACKGROUND OF THE INVENTION

1. Field of the Invention

The present invention relates to a secondary cell, and more particularly to a spinel-type LiMn secondary cell.

2. Description of the Related Art

Electric vehicles and hybrid cars are presently developed as motor-driven mobile vehicles primarily for the purpose of environmental protection, and there is a demand for small, lightweight, high-performance secondary batteries as a power supply for those vehicles.

Such secondary batteries include a spinel-type LiMn secondary cell as disclosed in Japanese Patent Laid-open Publication No. 92250/1997 and Japanese Patent Laid-open Publication No. 133221/2000. The spinel-type LiMn secondary cell is small and lightweight, has a large capacity, and provides good charging characteristics and cyclic characteristics.

Figure 1:
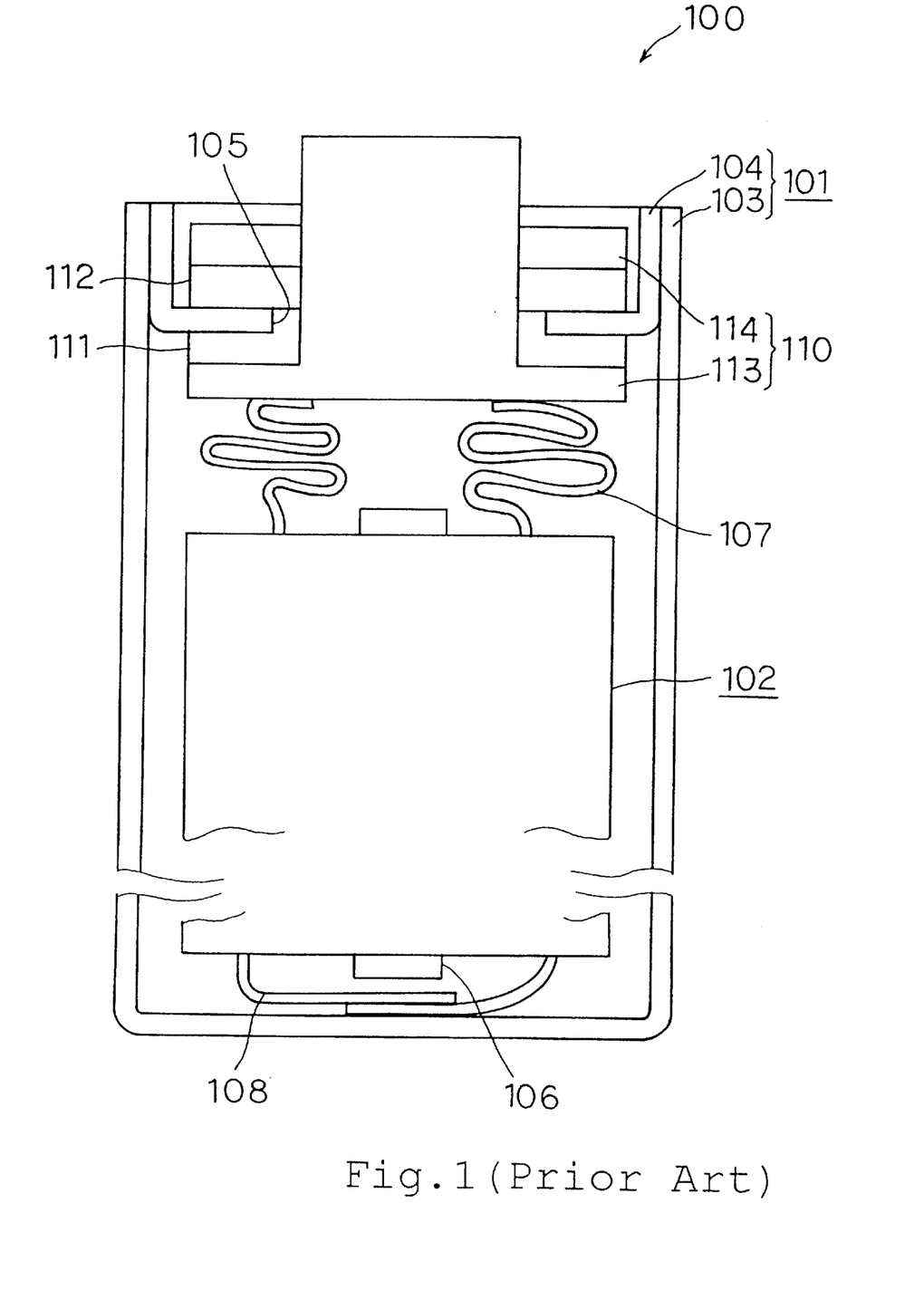
FIG. 1 is a vertical cross-sectional view showing an internal structure of a conventional LiMn secondary cell.

One conventional spinel-type LiMn secondary cell will be described below with reference to FIG. 1 of the accompanying drawings. As shown in FIG. 1, the conventional spinel-type LiMn secondary cell, denoted by 100, has cell casing 101 and electrode unit 102 housed in cell casing 101.

Cell casing 101 comprises main member 103 and lid member 104, each made of iron placed with nickel. Main member 103 is in the form of a hollow cylinder having a closed lower end and an open upper end. Lid member 104 is in the form of a disk closing the open upper end of main member 103.

Lid member 104 has circular through hole 105 defined centrally therein, and is welded to the open upper end of main member 103. Electrode unit 102 comprises a positive electrode sheet, a negative electrode sheet (both not shown), and hollow core 106. The positive electrode sheet and the negative electrode sheet, which are laminated together with a separator sheet interposed there between, are wound into a cylindrical column around core 106.

The positive electrode sheet has its surfaces uniformly coated with a powdery positive electrode active material (not shown), and the negative electrode sheet has its surfaces uniformly coated with a powdery negative electrode active material. The surfaces of the positive and negative electrode sheets refer to both face and back sides thereof.

The positive electrode sheet is made of pure aluminum, and the negative electrode sheet is made of pure copper. The positive electrode active material comprises a compound including lithium and manganese as indispensable constituents, and may, for example, be a powder of $LiMn_2O_4$. The negative electrode active material comprises a compound including carbon as an indispensable constituent. The gap between the sheets of electrode unit 102 is impregnated with a nonaqueous electrolytic solution.

A plurality of positive electrode tabs 107 made of pure aluminum project upwardly from an upper edge of the positive electrode sheet, and a plurality of negative electrode tabs 108 made of pure copper project downwardly from a lower edge of the negative electrode sheet. Therefore, positive electrode tabs 107 project upwardly from respective positions on the upper surface of electrode unit 102, and negative electrode tabs 108 project downwardly from respective positions on the lower surface of electrode unit 102.

Negative electrode tabs 108 projecting downwardly from the lower surface of electrode unit 102 are bent toward the center of electrode unit 102, and superposed at the center of electrode unit 102 and welded directly to the inner surface of the bottom of main member 103. Positive electrode tabs 107 projecting upwardly from the upper surface of electrode unit 102 are welded to the bottom of positive electrode member 110.

Positive electrode member 110 is mounted in circular through hole 105 in lid member 104 by insulating members 111, 112.

Insulating members 111, 112 are made of polypropylene, and are in the from of a pair of annular members held in intimate contact with lower and upper surfaces of a flange of lid member 104 that defines through hole 105 centrally in lid member 104.

Positive electrode member 110 comprises knurled bolt 113 and knurled nut 114, each made of pure aluminum. Knurled bolt 113 extends upwardly in through hole 105 in lid member 104 with insulating member 111 interposed between knurled bolt 113 and lid member 104, and knurled nut 114 is threaded on knurled bolt 113 with insulating member 112 interposed between insulating member 112 and lid member 104, thus hermetically closing cell casing 101. Positive electrode tabs 107 are welded to the bottom of the head of knurled bolt 113 that is positioned within cell casing 101.

Since the positive electrode sheet and the negative electrode sheet, between which the nonaqueous electrolytic solution is impregnated, develop positive and negative potentials, respectively, the threaded stud of knurled bolt 113 which projects upwardly from the upper surface of LiMn secondary cell 100 functions as a positive electrode, and the lower surface of main member 103 functions as a negative electrode.

LiMn secondary cell 100 is of a large size as a whole for use on a motor-driven mobile vehicle such as an electric vehicle. Lid member 104 of cell casing 101 is welded to main member 103 thereof for giving LiMn secondary cell 100 a desired level of mechanical strength. Therefore, main member 103 cannot be insulated from lid member 104, which thus cannot be used as a positive electrode.

Instead, positive electrode member 110 mounted on lid member 104 by insulating members 111, 112 functions as a positive electrode that is insulated from cell casing 101.

Though positive electrode member 110, positive electrode tabs 107, and the positive electrode sheet are connected to each other, they are made of pure aluminum and are not subject to an unwanted chemical reaction such as electrolytic corrosion.

Since positive electrode member 110 comprises knurled bolt 113 and knurled nut 114, which are generally available parts, positive electrode member 110 is simple in structure, can be constructed from an existing product, and can easily be installed on cell casing 101.

As the threaded stud of knurled bolt 113 which functions as a positive electrode projects from cell casing 101, it may be engaged by a positive electrode terminal of a motor-driven mobile vehicle, which may be tightened in place by a hexagonal nut (not shown) threaded over the threaded stud of knurled bolt 113.

As described above, because lid member 104 is welded to main member 103 as a negative electrode to achieve a desired level of mechanical strength, positive electrode member 110 as a positive electrode is mounted in through hole 105 by insulating members 111, 112, and is made of pure aluminum as with the positive electrode sheet and positive electrode tabs 107 in order to prevent an unwanted chemical reaction.

However, inasmuch as positive electrode member 110 comprises knurled body 113 and knurled nut 114, it suffers a lack of mechanical strength as it is made of pure aluminum. Particularly, while a positive electrode terminal can easily be attached to and removed from knurled bolt 113 by a hexagonal nut, it is highly likely for the threads of the knurled bolt 113 to be worn out when a positive electrode terminal is repeatedly attached to and removed from knurled bolt 113.

Generally, a hexagonal nut for tightening a positive electrode terminal on knurled bolt 113 is made of iron, but not aluminum, for a reduced cost. Repeated tightening of an iron hexagonal nut on knurled bolt 113 accelerates wear on knurled bolt 113.

When LiMn secondary cell 100 is installed on a motor-driven mobile vehicle, since LiMn secondary cell 100 is subject to frequent vibrations and stresses, knurled bolt 113 tends to be worn at an accelerated rate.

In order to solve the above problems, JP92250/1997 discloses an attempt to increase the diameter of the knurled bolt which serves as a positive electrode and also increase the size of the threads of the knurled bolt. However, LiMn secondary cell 100 is not a product for independent use, but is mounted on a certain motor-driven apparatus, and hence is generally constructed according to various standards.

According to some standards, LiMn secondary cell 100 may possibly be constructed in a small size which makes it difficult to increase the diameter of positive electrode member 110. Though a positive electrode terminal can easily be attached to and removed from knurled bolt 113 by a hexagonal nut, as described above, the diameter of knurled bolt 113 and the size of the threads thereof cannot be increased in size if the positive electrode terminal and the hexagonal nut are standardized.

Positive electrode tabs 107 projecting from respective positions on the upper surface of electrode unit 102 are welded to the head of knurled bolt 113. If the diameter of knurled bolt 113 is increased, then positive electrode tabs 107 can be welded only to the bottom of the head of knurled bolt 113.

Figure 2:
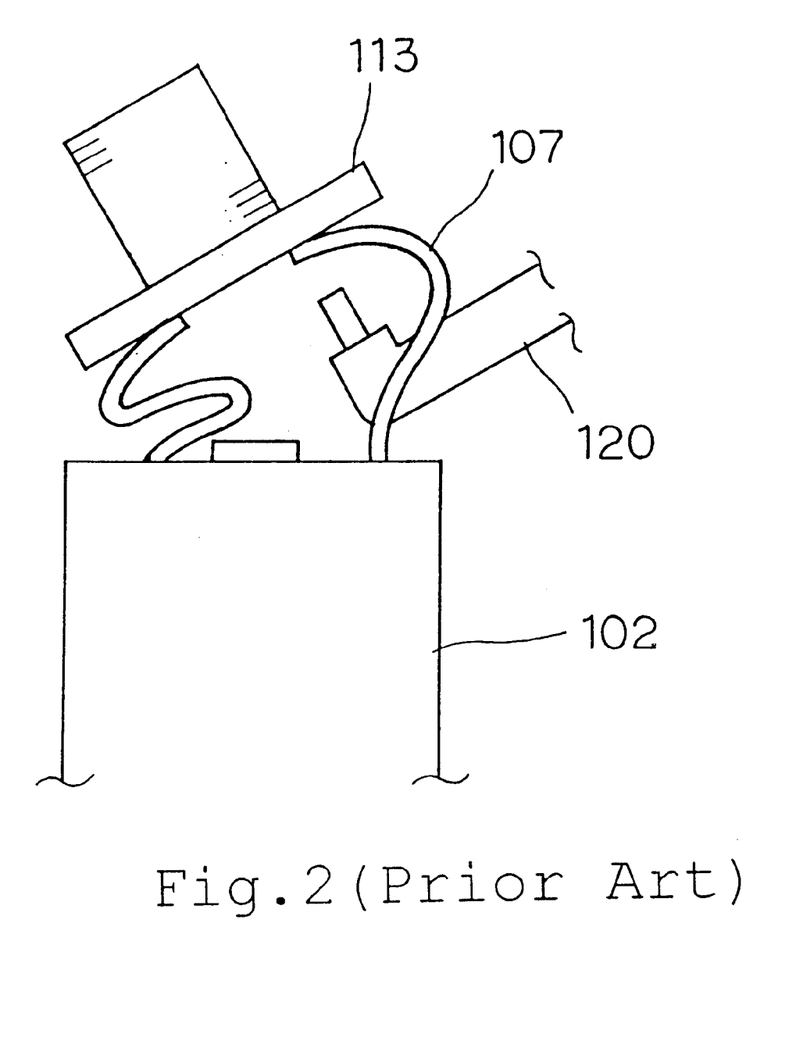
FIG. 2 is a front elevational view illustrative of a process of manufacturing the conventional LiMn secondary cell.

In the welding process, positive electrode tabs 107 that project axially of knurled bolt 113 need to be bent substantially at a right angle and welded to the bottom of the head of knurled bolt 113. At this time, as shown in FIG. 2 of the accompanying drawings, since electrode unit 102 positioned below the bottom of the head of knurled bolt 113 interferes with welding machine 120, the welding process is low in efficiency, and the productivity of LiMn secondary cell 100 is low.

For easily welding positive electrode tabs 107 to the bottom of the head of knurled bolt 113, it is necessary to extend positive electrode tabs 107. However, as shown in FIG. 1, because extended positive electrode tabs 107 need to be bent in multiple layers and positioned between the upper surface of electrode unit 102 and the lower surface of knurled bolt 113, the gap between the upper surface of electrode unit 102 and the lower surface of knurled bolt 113 needs to be increased, resulting in an increased dead space in cell casing 101.

LiMn secondary cell 100 also suffer the above shortcomings if knurled bolt 113 is constructed as a hexagonal bolt, an Allen bolt, a Huck bolt, a rivet, or the like.

SUMMARY OF THE INVENTION

It is an object of the present invention to provide a LiMn secondary cell having a structure in which a positive electrode member is mounted in a through hole in a cell casing by an insulating assembly, and which is capable of increasing the mechanical strength of the positive electrode member without causing an unwanted chemical reaction.

A spinel-type LiMn secondary cell according to the present invention comprises an electrode unit, a conductive cell casing, and a conductive positive electrode member as major components. The electrode unit is housed in the cell casing, and the positive electrode member is mounted in the cell casing.

The electrode unit has a positive electrode sheet and a negative electrode sheet which are laminated together with a separator sheet interposed there between, and wound into a cylindrical column. The electrode unit is impregnated with a nonaqueous electrolytic solution between the sheets. The positive electrode sheet is coated on surfaces thereof with a powdery positive electrode active material and connected to the positive electrode member by positive electrode tabs. The negative electrode sheet is coated on surfaces thereof with a powdery negative electrode active material and connected to the cell casing by negative electrode tabs. Since the positive electrode member is mounted in a through hole in the cell casing by an insulating assembly, the conductive cell casing serves as a negative electrode, and the conductive positive electrode member as a positive electrode.

As is the case with the conventional LiMn secondary cell, the positive electrode sheet is made mainly of aluminum, and the positive electrode active material includes lithium and manganese as indispensable constituents. Unlike the conventional LiMn secondary cell, the conductive positive electrode member is made of an aluminum alloy with manganese mixed therewith.

Since the aluminum alloy with manganese mixed therewith is of better mechanical strength than pure aluminum, the positive electrode member of the LiMn secondary cell according to the present invention has good mechanical strength. Because manganese mixed with the aluminum alloy of the positive electrode member is an indispensable constituent of the positive electrode active material, it does not cause an unwanted chemical reaction such as electrolytic corrosion.

The mechanical strength referred to above means various mechanically required aspects of strength including hardness, tenacity, wear resistance, etc.

The conductive positive electrode member is made of a 3000 series aluminum alloy. Thus, the conductive positive electrode member can be made of an existing aluminum alloy to provide good mechanical strength and make itself free of an unwanted chemical reaction. The LiMn secondary cell can thus be manufactured with increased productivity.

The conductive positive electrode member comprises a bolt and a nut. Therefore, it is simple in structure and can be constructed from an existing product, making it possible to manufacture the LiMn secondary cell with increased productivity.

The bolt extends through the through hole out of the cell casing, and the nut is threaded on the bolt which projects out of the cell casing. With this arrangement, the positive electrode member can simply be mounted in the cell casing, and it is easy to have a separate positive electrode terminal engage the bolt of the positive electrode member that projects from the cell casing and tightened on the bolt by a hexagonal nut.

The positive electrode tabs are welded to an outer side surface of a head of the bolt. Since the positive electrode tabs can be welded to an outer side surfaces of the head of the bolt which does not need to be unduly large in diameter, without being largely bent, the LiMn secondary cell can thus be manufactured with increased productivity, and a dead space where the positive electrode tabs are positioned can be reduced.

The insulating assembly comprises a closing member closing a gap between the cell casing and the positive electrode member, and a retaining member keeping the cell casing and the positive electrode member positioned relatively to each other. The positive electrode member having sufficient mechanical strength to allow external stresses applied thereto to act on the joint between the positive electrode member and the cell casing. However, because the bonding strength and closure of the cell casing and the positive electrode member are provided by the retaining member and the closing member of the insulating assembly, the insulating assembly is prevented from being broken, and no short circuit occurs between the positive electrode member and the cell casing.

The cell casing comprises a cylindrical main member and a disk-shaped lid member, the lid member having the through hole defined therein, the main member having an open end, the lid member being welded to the open end of the main member. The electrode unit can easily be housed in the cell casing, and the cell casing is strong in its entirety with the through hole defined in one end thereof. The strength of exposed parts of the LiMn secondary cell can be increased as a whole.

The LiMn secondary cell can be manufactured by forming the positive electrode sheet mainly of aluminum, producing the positive electrode active material of lithium and manganese as indispensable constituents, and forming the positive electrode member of an aluminum alloy with manganese mixed therewith.

The method further comprises the step of ultrasonically welding the positive electrode tabs to the positive electrode member. A highly insulating oxide film is formed of its own accord on the surface of the positive electrode member that is made of an aluminum alloy with manganese mixed therewith. When the positive electrode tabs are ultrasonically welded to the positive electrode member, the oxide film is broken, allowing the positive electrode tabs to be well electrically connected to the positive electrode member.

A motor-driven mobile vehicle according to the present invention has a negative electrode terminal held against and electrically connected to at least the cell casing of the spinel-type LiMn secondary cell, a positive electrode terminal engaging and electrically connected to the bolt of the LiMn secondary cell by a nut. An electric motor on the motor-driven mobile vehicle is energizable by electric energy supplied from the negative electrode terminal and the positive electrode terminal, and a vehicle body supporting the electric motor and the spinel-type LiMn secondary cell is moved by a moving means with power produced by the electric motor.

The motor-driven mobile vehicle can be operated with the spinel-type LiMn secondary cell used as a power supply. Even when frequent vibrations and stresses are applied from the positive electrode terminal to the positive electrode member of the spinel-type LiMn secondary cell while the motor-driven mobile vehicle is moving, since the positive electrode member has good mechanical strength, it is prevented from being broken or unduly worn. The motor-driven mobile vehicle is thus of increased reliability and durability.

The above and other objects, features, and advantages of the present invention will become apparent from the following description with reference to the accompanying drawings which illustrate an example of the present invention.

DETAILED DESCRIPTION OF THE PREFERRED EMBODIMENT

A LiMn secondary cell according to an embodiment of the present invention will be described below with reference to FIGS. 3 through 7. The terms which represent directions, such as upper and lower, are used herein for the purpose of simplifying the description, and should not be interpreted to limit any directions at the time the LiMn secondary cell is actually manufactured and used.

Figure 3:
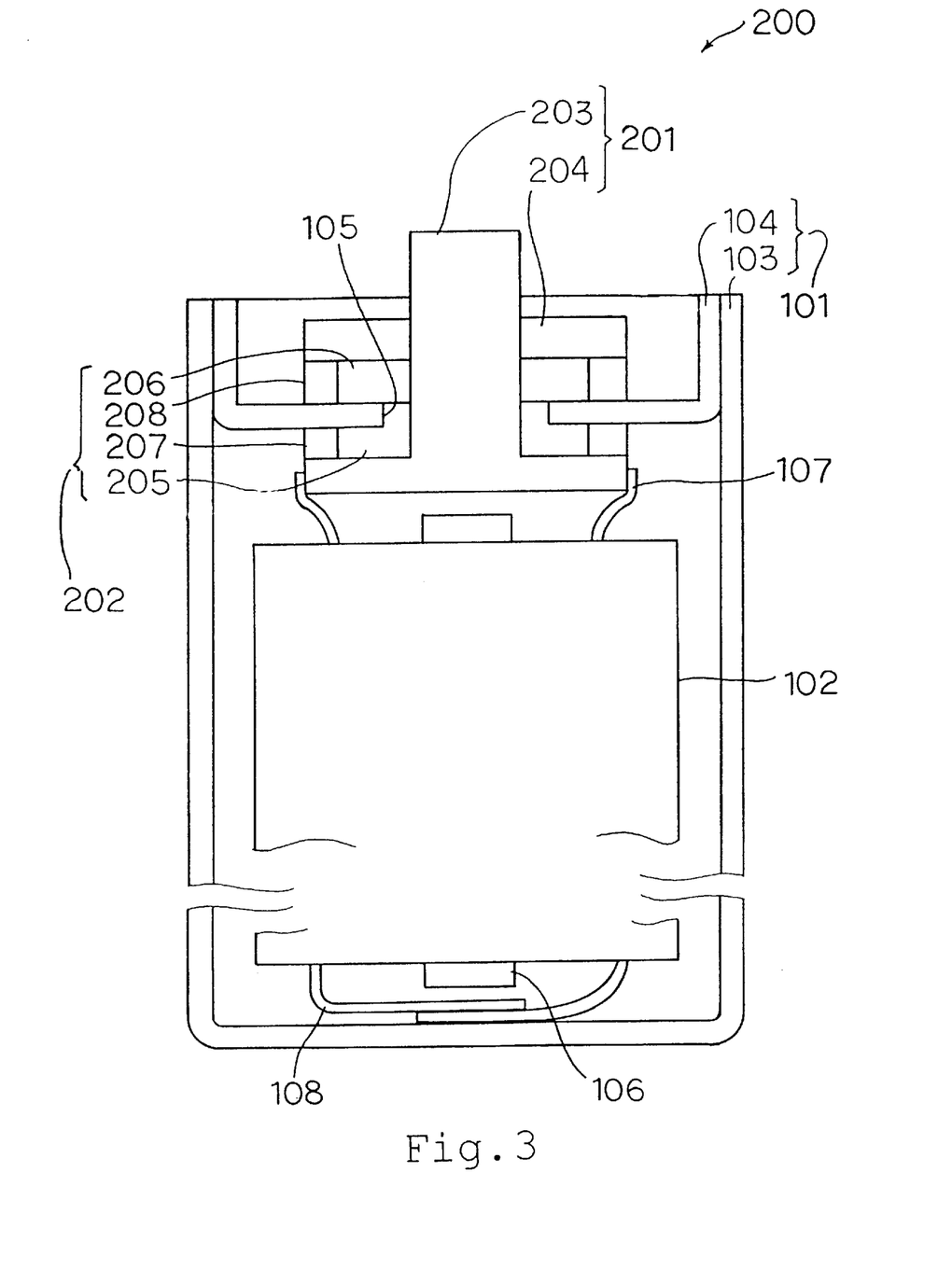
FIG. 3 is a vertical cross-sectional view showing an internal structure of a LiMn secondary cell according to an embodiment of the present invention.
Figure 4:
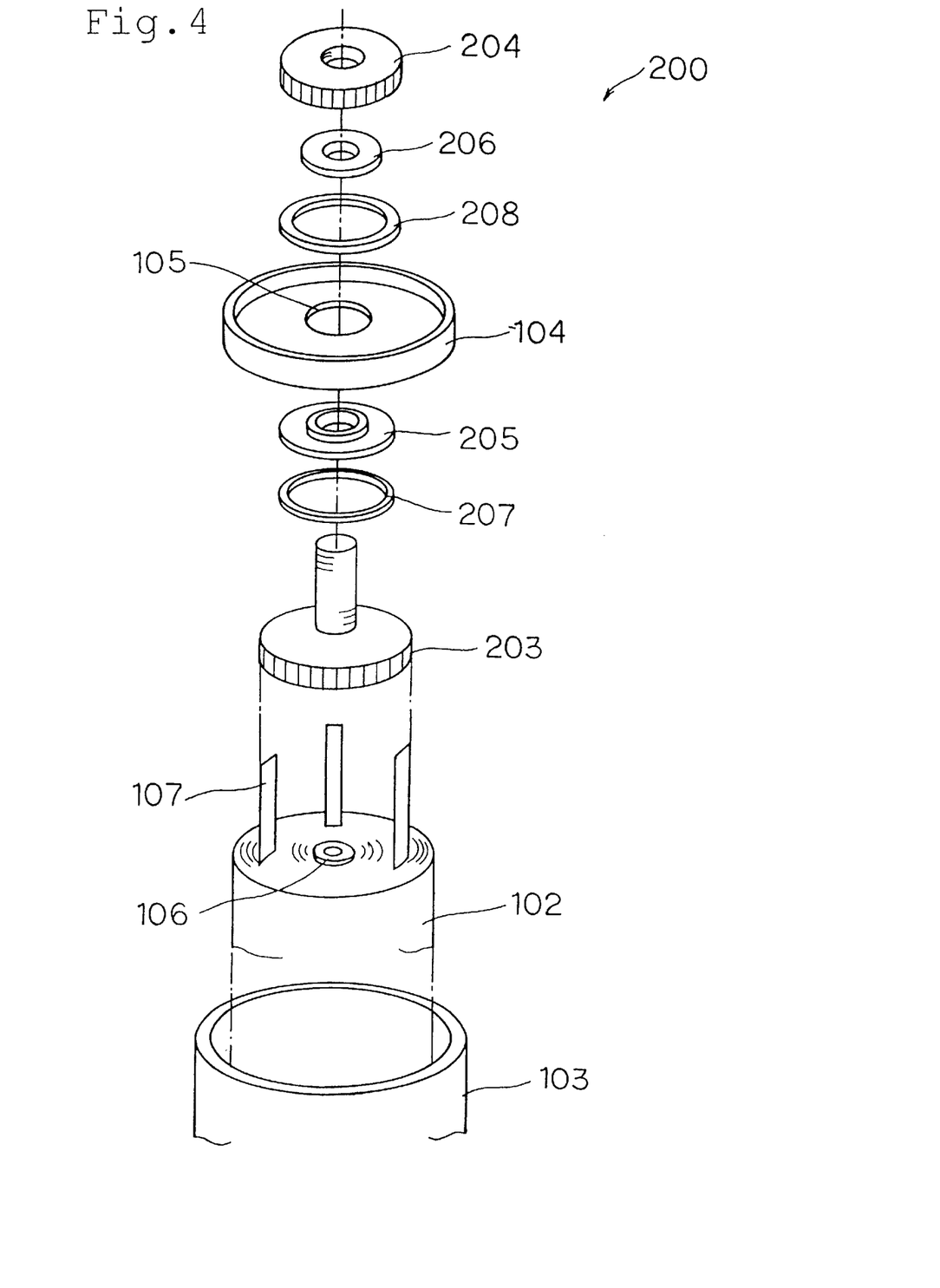
FIG. 4 is an exploded perspective view of the LiMn secondary cell shown in FIG. 3.

As shown in FIGS. 3 and 4, LiMn secondary cell 200 according to the present invention has cell casing 101 and electrode unit 102 housed in cell casing 101. Cell casing 101 is of such a structure in which disk-shaped lid member 104 is welded to an open end of cylindrical main member 103.

Electrode unit 102 comprises a positive electrode sheet and a negative electrode sheet which are laminated together with a separator sheet interposed there between and wound into a cylindrical column around core 106. The cylindrical column of the positive and negative electrode sheets is impregnated with a nonaqueous electrolytic solution. The positive electrode sheet is made of pure aluminum and has its surfaces uniformly coated with a powdery positive electrode active material of $LiMn_2O_4$. Positive electrode member 201 is mounted in through hole 105 defined in cell casing 101 by an insulating assembly 202. Positive electrode tabs 107 of pure aluminum projecting from electrode unit 102 are connected to positive electrode member 201.

Positive electrode member 201 comprises knurled bolt 203 and knurled nut 204. Unlike conventional LiMn secondary cell 100, each of knurled bolt 203 and knurled nut 204 is made of a 3000 series aluminum alloy with manganese mixed therewith.

Insulating assembly 202 comprises a pair of closing members 205, 206 and a pair of retaining members 207, 208. Closing members 205, 206 are positioned within retaining members 207, 208. More specifically, closing members 205, 206 are made of insulating polypropylene, and are in the form of annular members as is the case with conventional insulating members 111, 112. Closing members 205, 206 are held in intimate contact with lower and upper surfaces of a flange of lid member 104 that defines through hole 105 centrally in lid member 104, closing the gap between lid member 104 and positive electrode member 201. Retaining members 207, 208 are made of insulating fine ceramics and are in the form of annular members engaging outer surfaces of closing members 205, 206. Retaining members 207, 208 keep cell casing 101 and positive electrode member 201 positioned relatively to each other.

In the assembled structure of LiMn secondary cell 200, as shown in FIGS. 3 and 4, lower closing member 205 is fitted upwardly in through hole 105 in lid member 104, and lower retaining member 207 is fitted around lower closing member 104.

Knurled bolt 203 is inserted upwardly in a through hole which is defined in closing member 205, and upper closing member 206 is fitted downwardly over the threaded stud of knurled bolt 203 which projects through closing member 205. Upper retaining member 208 is fitted around closing member 206, and knurled nut 204 is threaded over knurled bolt 203 and held against closing member 206 and retaining member 208.

Knurled bolt 203 and knurled nut 204 of LiMn secondary cell 200 are smaller in diameter than those of conventional LiMn secondary cell 100. Positive electrode tabs 107 of electrode unit 102 are ultrasonically welded to an outer side surface of the head of small-diameter knurled bolt 203.

Figure 5:
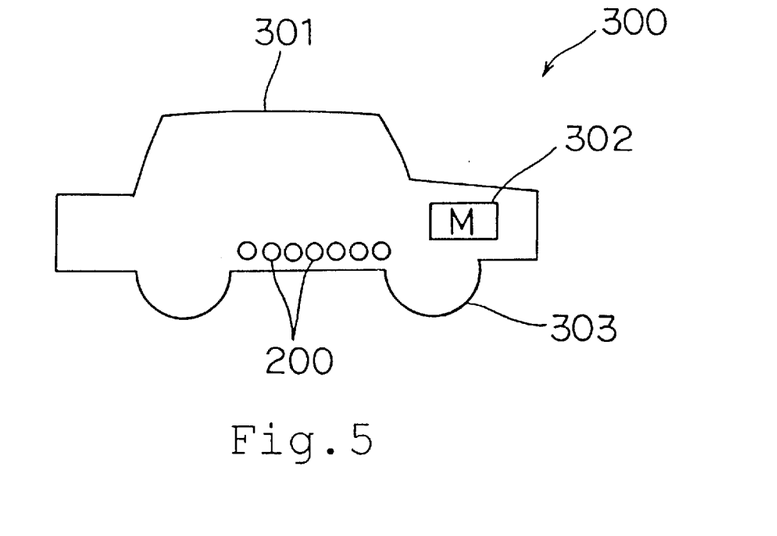
FIG. 5 is a schematic view of an electric vehicle as a motor-driven mobile vehicle which incorporates the LiMn secondary cell according to the present invention.

As shown in FIG. 5, LiMn secondary cell 200 is mounted on vehicle body 301 of electric vehicle 300 as a motor-driven mobile vehicle. Electric vehicle 300 has electric motor 302 and moving means 303 coupled to electric motor 302. Moving means 303 comprise gear trains and wheels.

Figure 6:
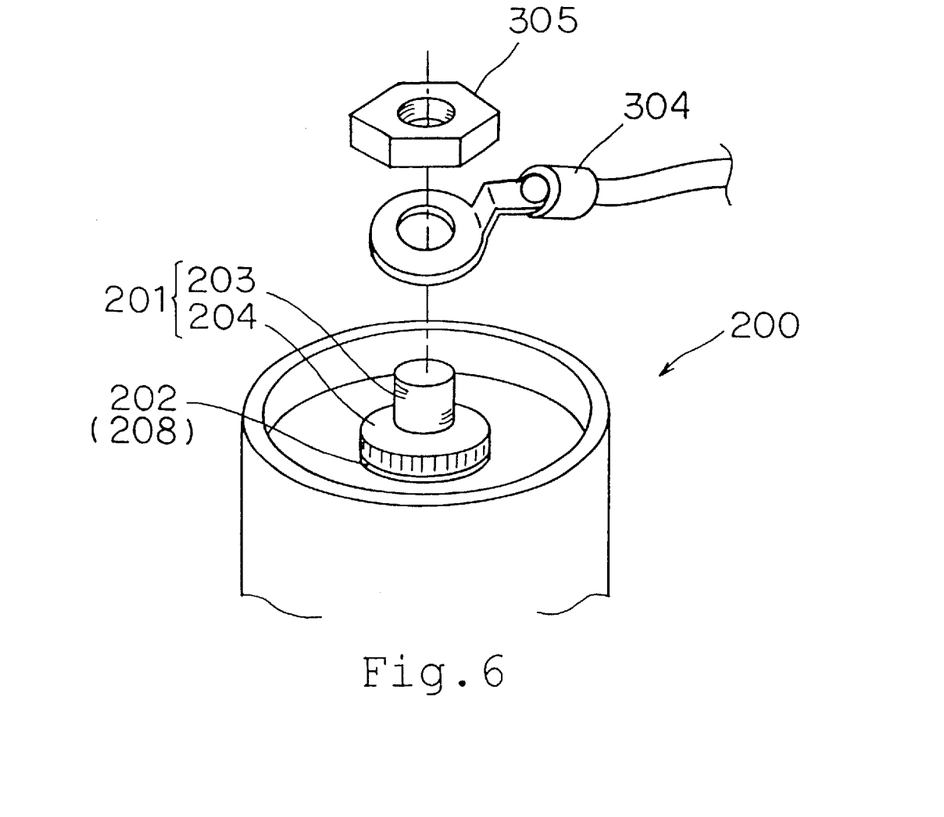
FIG. 6 is an exploded perspective view showing the manner in which a positive electrode terminal is connected to the LiMn secondary cell according to the present invention.

A negative electrode terminal (not shown) and positive electrode terminal 304 (see FIG. 6) are connected via a control circuit to electric motor 302. The negative electrode terminal is held against and electrically connected to cell casing 101 of LiMn secondary cell 200. As shown in FIG. 6, positive electrode terminal 304 engages and is electrically connected to knurled bolt 203 of LiMn secondary cell 200, and is threaded and tightened on knurled bolt 203 by hexagonal nut 305.

LiMn secondary cell 200 according to the illustrated embodiment functions in the same manner as with conventional LiMn secondary cell 100. However, unlike conventional LiMn secondary cell 100, LiMn secondary cell 200 has a higher level of mechanical strength because positive electrode member 201 is made of a 3000 series aluminum alloy. Since manganese mixed with the aluminum alloy of positive electrode member 201 is a constituent indispensable for the positive electrode active material, it will not cause an unwanted chemical reaction such as electrolytic corrosion.

Since positive electrode member 201 of LiMn secondary cell 200 has high mechanical strength, the bonding strength of positive electrode member 201 and lid member 104 is high unlike conventional LiMn secondary cell 100. As is the case with conventional LiMn secondary cell 100, the bonding strength of lid member 104 and main member 103 is high, so that the mechanical strength of exposed parts of LiMn secondary cell 200 is high as a whole.

Since positive electrode member 201 comprises knurled bolt 203 and knurled nut 204, it is simple in structure and can be constructed from an existing product. As shown in FIGS. 3 and 4, because knurled nut 204 is threaded and tightened on knurled bolt 203 that extends in through hole 105 and projects out of cell casing 101, positive electrode member 201 can easily be installed in cell casing 101, and separate positive electrode terminal 304 can easily engage knurled bolt 203 of positive electrode member 201 and can be tightened around knurled bolt 203 by hexagonal nut 305.

With electric vehicle 300, as shown in FIG. 6, positive electrode terminal 304 is tightened around knurled bolt 203 by hexagonal nut 305, and electric motor 302 is energized by electric energy generated by LiMn secondary cell 200 to actuate moving means 302 to move electric vehicle 300.

When electric vehicle 300 is moved, vibrations and stresses are frequently applied to knurled bolt 203. However, since main member 103, lid member 104, and positive electrode member 201 have high mechanical strength and high bonding strength, positive electrode member 201 is effectively prevented from being broken and worn.

With the high mechanical strength of positive electrode member 201, external stresses applied to positive electrode member 201 are also applied to the joint between positive electrode member 201 and cell casing 101. With LiMn secondary cell 200 according to the present embodiment, as described above, insulating member 202 by which positive electrode member 201 and lid member 104 are insulated from each other comprises closing members 205, 206 and retaining members 207, 208.

The gap between lid member 104 and positive electrode member 201 is closed by closing members 205, 206, whereas cell casing 101 and positive electrode member 201 are relatively positioned by retaining members 207, 208. Therefore, even when external stresses are applied to positive electrode member 201 that is joined to cell casing 101, insulating assembly 202 is prevented from being broken, and no short circuit occurs between positive electrode member 201 and cell casing 101.

Furthermore, since positive electrode member 201 is of high mechanical strength, its diameter does not need to be unduly large. Consequently, knurled bolt 203 and knurled nut 204 can be reduced in diameter, and their cost can be reduced. As a result, positive electrode member 201 and hence LiMn secondary cell 200 can also easily be reduced in diameter.

It is easy to manufacture knurled bolt 203 and knurled nut 204 to certain standards while their mechanical strength is maintained at a required level, positive electrode terminal 304 and hexagonal nut 305 can simply and reliably be mounted on LiMn secondary cell 200.

Inasmuch as positive electrode member 201 of good mechanical strength can be shaped to a desired diameter, as shown in FIG. 3, positive electrode tabs 107 projecting upwardly from the upper surface of electrode unit 102 can be welded to the outer side surface of the head of knurled bolt 203 without being largely bent.

Figure 7:
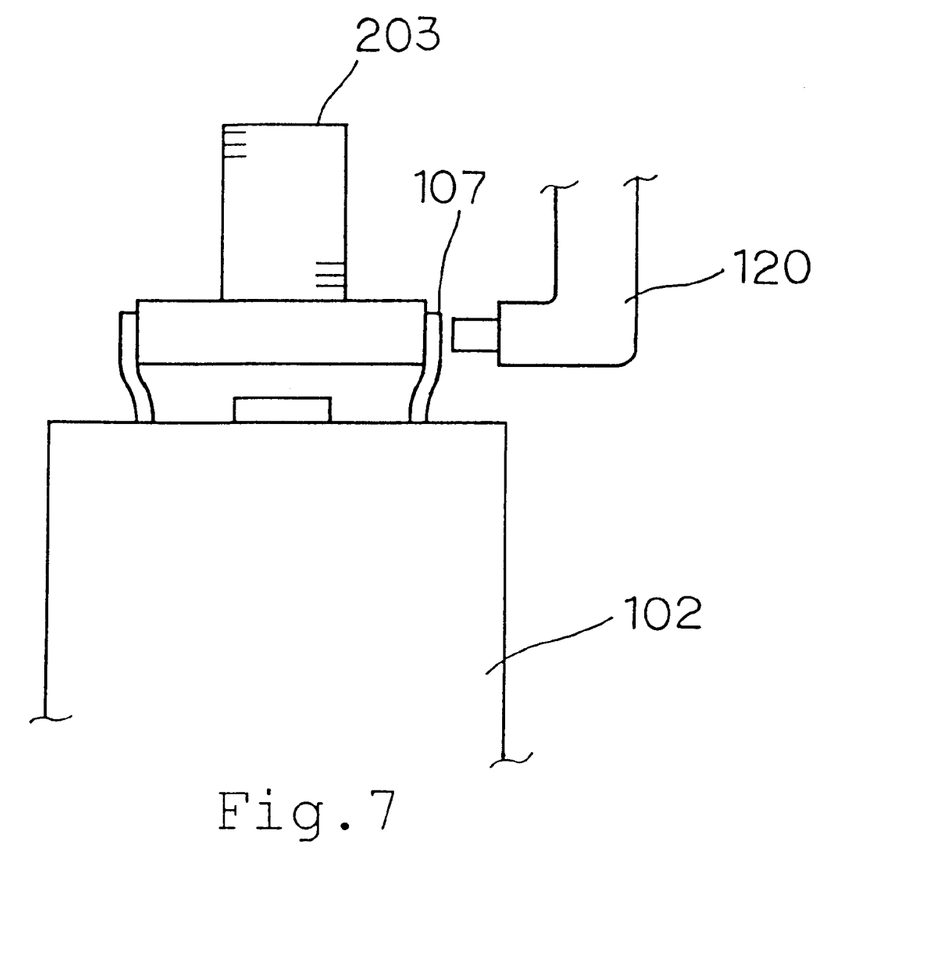
FIG. 7 is a front elevational view illustrative of a process of manufacturing the LiMn secondary cell according to the present invention.

Therefore, as shown in FIG. 7, positive electrode tabs 107 projecting upwardly from the upper surface of electrode unit 102 can be welded as they are to the outer side surface of the head of knurled bolt 203. Since electrode unit 102 is kept out of interference with welding machine 120, unlike the situation shown in FIG. 2, LiMn secondary cell 200 according to the present embodiment can be manufactured with good productivity.

Positive electrode tabs 107 of electrode unit 102 that can easily be welded to knurled bolt 203 do not need to be unduly extended. Consequently, as shown in FIG. 3, positive electrode tabs 107 that are positioned in the gap between the upper surface of electrode unit 102 and the lower surface of knurled bolt 203 are not required to be bent in multiple layers, and any dead space is prevented from increasing as the gap is not increased.

Because knurled bolt 203 is made of an aluminum alloy with manganese mixed therewith, a highly insulating oxide film is formed of its own accord on the surface thereof, effectively preventing a short circuit between lid member 104 and the negative electrode sheet of electrode unit 102.

In a process of manufacturing the LiMn secondary cell 200 according to the present embodiment, positive electrode tabs 107 of electrode unit 102 are ultrasonically welded to knurled bolt 203. When positive electrode tabs 107 of electrode unit 102 are ultrasonically welded to knurled bolt 203, the oxide film on knurled bolt 203 is broken to provide a good electric contact between positive electrode tabs 107 and positive electrode member 201.

In the above embodiment, positive electrode member 201 is illustrated as comprising knurled bolt 203 and knurled nut 204. However, positive electrode member 201 may comprise a hexagonal bolt and a hexagonal nut, or a rivet.

In the above embodiment, the positive electrode active material containing lithium and manganese as indispensable constituents is illustrated as being $LiMn_2O_4$. However, the positive electrode active material may be $Li_{(1+x)}Mn_{(2-x)}O_4$ (X=0 to 0.2) or $Li_{(1+x)}Mn_2O_4$ (X=0 to 0.2).

While a preferred embodiment of the present invention has been described using specific terms, such description is for illustrative purposes only, and it is to be understood that changes and variations may be made without departing from the spirit or scope of the following claims.

What is claimed is:

1. A spinel-type LiMn secondary cell comprising:
   an electrically conductive cell casing having a through hole defined in one end thereof;
   an electrode unit having a positive electrode sheet coated on surfaces thereof with a powdery positive electrode active material and a negative electrode sheet coated on surfaces thereof with a powdery negative electrode active material, said positive electrode sheet and said negative electrode sheet being laminated together with a separator sheet interposed there between, and wound into a cylindrical column, said electrode unit being impregnated with a nonaqueous electrolytic solution between the sheets and housed in said cell casing;
   an electrically conductive positive electrode member mounted in said through hole in said cell casing by an electrically insulating assembly;
   positive electrode tabs connecting said positive electrode sheet at an end of said electrode unit to said positive electrode member; and
   negative electrode tabs connecting said negative electrode sheet at an opposite end of said electrode unit to said cell casing;
   said positive electrode sheet being mainly made of aluminum;
   said powdery positive electrode active material including both lithium and manganese;
   said electrically conductive positive electrode member being made of an aluminum alloy with manganese mixed therewith.

2. A LiMn secondary cell according to claim 1, wherein said electrically conductive positive electrode member is made of a 3000 series aluminum alloy.

3. A LiMn secondary cell according to claim 1, wherein said electrically conductive positive electrode member comprises a bolt and a nut.

4. A LiMn secondary cell according to claim 3, wherein said bolt extends through said through hole out of said cell casing, and said nut is threaded on said bolt which projects out of said cell casing.

5. A LiMn secondary cell according to claim 4, wherein said positive electrode tabs are welded to an outer side surface of a head of said bolt.

6. A LiMn secondary cell according to claim 1, wherein said electrically insulating assembly comprises:
   a closing member closing a gap between said cell casing and said positive electrode member; and
   a retaining member keeping said cell casing and said positive electrode member positioned relatively to each other.

7. A LiMn secondary cell according to claim 1, wherein said cell casing comprises a cylindrical main member and a disk-shaped lid member, said lid member having said through hole defined therein, said cylindrical main member having an open end, and said lid member being welded to said open end of said cylindrical main member.

8. A method of manufacturing a spinel-type LiMn secondary cell according to claim 1, comprising the steps of:
   forming said positive electrode sheet mainly of aluminum;
   producing said positive electrode active material of lithium and manganese; and
   forming said positive electrode member of an aluminum alloy with manganese mixed therewith.

9. A method according to claim 8, further comprising the step of:
   ultrasonically welding said positive electrode tabs to said positive electrode member.

10. A motor-driven mobile vehicle comprising:
    a spinel-type LiMn secondary cell according to claim 4;
    a negative electrode terminal held against and electrically connected to the cell casing of said spinel-type LiMn secondary cell;
    a positive electrode terminal engaging and electrically connected to the bolt of said LiMn secondary cell;
    a nut tightening said positive electrode terminal to said bolt;
    an electric motor energizable by electric energy supplied from said negative electrode terminal and said positive electrode terminal;
    a vehicle body supporting at least said electric motor and said spinel-type LiMn secondary cell; and
    moving means for moving said vehicle body with power produced by said electric motor.

* * * * *